US010885235B2

(12) United States Patent
Symmonds

(10) Patent No.: US 10,885,235 B2
(45) Date of Patent: Jan. 5, 2021

(54) MULTI-USER VIRTUAL PRODUCT DEVELOPMENT ENVIRONMENT

(75) Inventor: Matthew M. Symmonds, Mercer Island, WA (US)

(73) Assignee: The Boeing Company, Chicago, IL (US)

(*) Notice: Subject to any disclaimer, the term of this patent is extended or adjusted under 35 U.S.C. 154(b) by 773 days.

(21) Appl. No.: 13/584,084

(22) Filed: Aug. 13, 2012

(65) Prior Publication Data

US 2014/0046712 A1   Feb. 13, 2014

(51) Int. Cl.
*G06Q 10/10* (2012.01)
*G06F 111/02* (2020.01)
*G06F 30/15* (2020.01)
*G06Q 10/06* (2012.01)

(52) U.S. Cl.
CPC .......... *G06F 30/15* (2020.01); *G06Q 10/101* (2013.01); *G06F 2111/02* (2020.01); *G06Q 10/06* (2013.01)

(58) Field of Classification Search
CPC .......... G06Q 10/063118; G06Q 10/101; G06F 30/10–30/18; G06F 2111/02
USPC ........................................................ 705/300
See application file for complete search history.

(56) References Cited

U.S. PATENT DOCUMENTS

| | | | |
|---|---|---|---|
| 5,539,906 A * | 7/1996 | Abraham | G06F 12/1483 |
| 5,646,862 A | 7/1997 | Jolliffe et al. | |
| 5,930,768 A * | 7/1999 | Hooban | G06Q 30/02 369/84 |
| 6,295,513 B1 * | 9/2001 | Thackston | G05B 19/4099 703/1 |
| 6,341,291 B1 * | 1/2002 | Bentley | G06F 16/21 |
| 6,614,430 B1 * | 9/2003 | Rappoport | G06F 30/17 345/420 |
| 6,741,904 B1 * | 5/2004 | Gage | G06Q 10/087 700/132 |
| 6,959,268 B1 * | 10/2005 | Myers, Jr. | G06Q 10/10 703/6 |
| 7,079,990 B2 * | 7/2006 | Haller | G05B 19/41805 345/420 |
| 7,099,803 B1 | 8/2006 | Rappoport et al. | |

(Continued)

FOREIGN PATENT DOCUMENTS

CN    1334540 A    2/2002
CN    1882959 A    12/2006
(Continued)

OTHER PUBLICATIONS

EDI Basics; sponsored by GXS; http://www.edibasics.co.uk as captured on Aug. 13, 2007 by Internet Archive Wayback Machine; Accessed on Jul. 23, 2014.*

(Continued)

*Primary Examiner* — Christine M Behncke
*Assistant Examiner* — Abhijit B Sadananda
(74) *Attorney, Agent, or Firm* — Yee & Associates, P.C.

(57) ABSTRACT

A method and apparatus for developing a product. A product development environment comprises a system. The system further comprises a virtual product online world manager and a transformer. The virtual product online world manager is configured to manage elements for a product under development in a virtual product online world. The transformer is configured to exchange the elements with a number of product development systems developing the elements over a network.

21 Claims, 10 Drawing Sheets

(56) References Cited

U.S. PATENT DOCUMENTS

| | | | | |
|---|---|---|---|---|
| 7,519,449 | B2* | 4/2009 | Rhee | G06F 17/50 345/419 |
| 7,584,078 | B2* | 9/2009 | Junghans | G06F 17/50 345/440 |
| 7,634,455 | B1* | 12/2009 | Keene | G06F 21/6245 |
| 7,714,860 | B2* | 5/2010 | Trotta | G06T 17/00 345/427 |
| 7,814,110 | B2 | 10/2010 | Anelle et al. | |
| 2001/0007095 | A1* | 7/2001 | Kehrle | G06T 17/10 703/2 |
| 2001/0016803 | A1* | 8/2001 | Sartiono | G06F 30/15 703/1 |
| 2002/0013719 | A1* | 1/2002 | Shiiba | G06Q 30/06 700/100 |
| 2002/0107673 | A1* | 8/2002 | Haller | G06T 19/20 703/1 |
| 2003/0033311 | A1* | 2/2003 | Skinner | G06Q 10/04 |
| 2003/0055659 | A1* | 3/2003 | Alling | G06F 17/50 705/300 |
| 2003/0078859 | A1* | 4/2003 | Coke, II | G06Q 10/101 705/300 |
| 2003/0167201 | A1* | 9/2003 | Yamano | G06Q 10/06 705/300 |
| 2003/0172366 | A1 | 9/2003 | Rhee et al. | |
| 2004/0111639 | A1* | 6/2004 | Schwartz | H04L 63/302 726/1 |
| 2005/0125750 | A1* | 6/2005 | Lorenz | G06F 30/17 716/102 |
| 2005/0251462 | A1* | 11/2005 | Nykamp | G06Q 10/10 705/26.41 |
| 2007/0061154 | A1* | 3/2007 | Markvoort | G06F 17/50 705/51 |
| 2007/0079117 | A1* | 4/2007 | Bhogal | H04L 9/00 713/160 |
| 2008/0141334 | A1 | 6/2008 | Wicker et al. | |
| 2008/0301012 | A1* | 12/2008 | Cogswell | G06Q 10/06 705/29 |
| 2013/0144566 | A1* | 6/2013 | De Biswas | G06T 17/005 703/1 |

FOREIGN PATENT DOCUMENTS

| | | |
|---|---|---|
| CN | 101681335 A | 3/2010 |
| JP | 2007148739 A | 6/2007 |
| JP | 2007516516 A | 6/2007 |

OTHER PUBLICATIONS

Iosup et al., "CAMEO: Enabling Social Networks for Massively Multiplayer Online Games through Continuous Analytics and Cloud Computing," 9th Annual Workshop on Network and Systems Support for Games (NetGames), Nov. 2010, 6 Pages.

Shao et al., "Emergency Room Simulation Prototypes for Incident Management Training," National Institute of Standards and Technology, Proceedings of the 2008 Industrial Simulation Conference, Jun. 2008, 10 Pages.

Tveit, "Postdoctoral Research Proposal: High Performance Data Mining for Increased Player Personalization and Integration of E-Commerce in Massively Multiplayer Online Games," Jun. 2003, 7 Pages, accessed Jul. 17, 2012 http://amundtveit.info/publications/gameresearchproposal.pdf.

EP search report dated Oct. 22, 2013 regarding application 13179465. 3-1955, reference 1284P584EPCG, applicant The Boeing Company, 8 pages.

Whyte et al., "From CAD to virtual reality: modelling approaches, data exchange and interactive 3D building design tools," Automation in Construction, Elsevier Science Publishers, vol. 10, No. 1, Nov. 2000, pp. 43-55.

Canadian Intellectual Property Office Examination Search Report, dated Nov. 3, 2015, regarding Application No. 2,816,220, 4 pages.

State Intellectual Property Office of China, English Translation of First Notification of Office Action, regarding Application No. 2013103491443, dated Dec. 2, 2015, 22 pages.

Second Chinese Office Action, dated Aug. 8, 2016, regarding Application No. 201310349144.3, 46 pages.

Canadian Intellectual Property Office Examination Search Report, dated Oct. 21, 2016, regarding Application No. 2,816,220, 5 pages.

Third Chinese Office Action, dated Apr. 1, 2017, regarding Application No. 201310349144.3, 50 pages.

Japanese Patent Office Notice for Reasons of Rejection, dated Aug. 29, 2017, regarding Application No. 2013-167309, 15 pages.

Canadian Intellectual Property Office Examination Report, dated Oct. 23, 2017, regarding Application No. 2,816,220, 4 pages.

European Examination Notice, dated Dec. 13, 2017, regarding Application No. 13179465.3 15 pages.

Extended European Search Report, dated May 18, 2018, regarding Application No. 18167113.2, 10 pages.

* cited by examiner

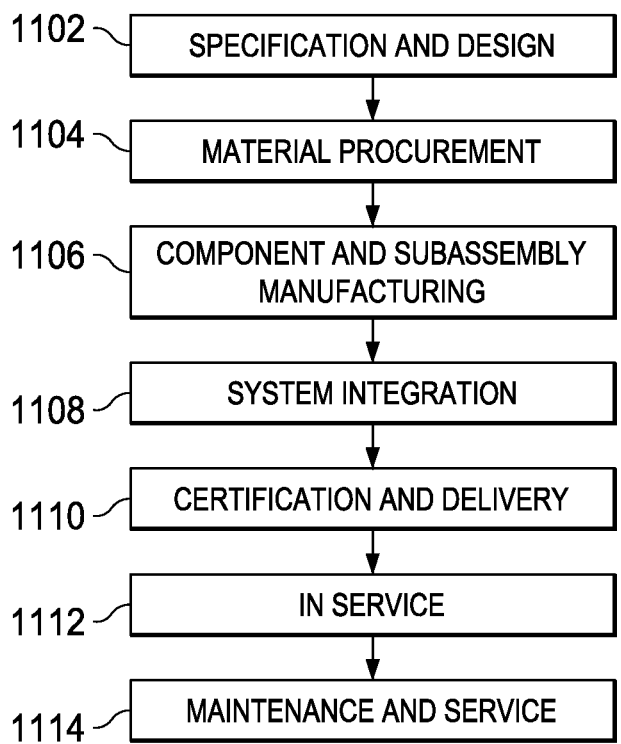
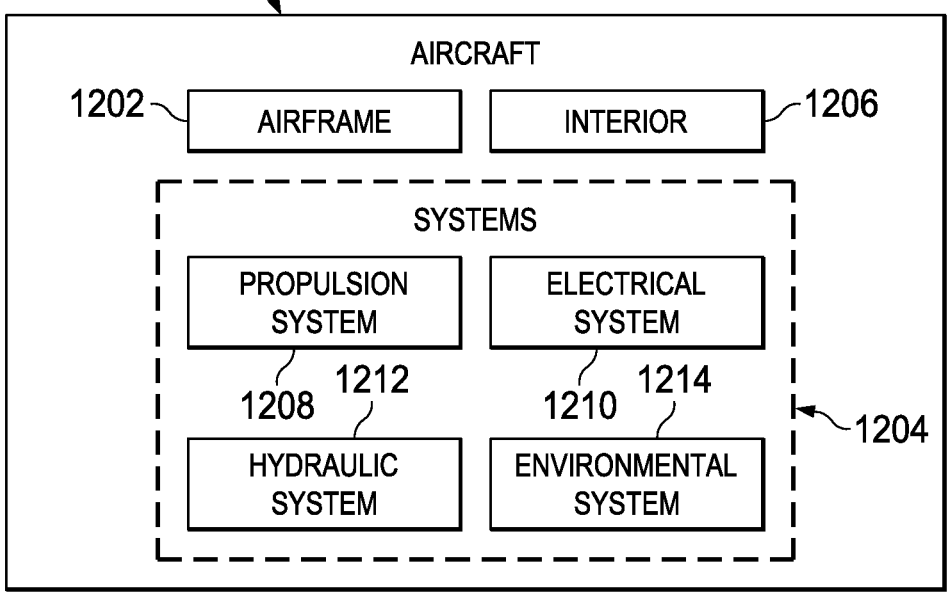

MULTI-USER VIRTUAL PRODUCT DEVELOPMENT ENVIRONMENT

BACKGROUND INFORMATION

1. Field

The present disclosure relates generally to developing products and, in particular, to developing products in a virtual environment. Still more particularly, the present disclosure relates to a method and apparatus for developing a product in a product development environment that has a virtual product online world.

2. Background

In developing aircraft, many different types of components may be designed and manufactured to form the aircraft. Components in the form of complex systems in the aircraft may be split into smaller portions and contracted to vendors for design and production. In other words, a component may be comprised of a group of components that are assembled or otherwise associated with each other to form the component. For example, a particular vendor may be contracted to design and manufacture components such as a landing gear assembly, a cockpit control system, a wing joint, a tail section, a cargo bay, a ventilation system, or any other component in the aircraft.

Each component is designed and tested based on desired properties for that component. For example, a landing gear strut in a landing gear assembly may be designed based on certain properties such as strength, material, temperature, or some other desired property making the landing gear strut suitable for installation in the aircraft.

Further, each component in the landing gear strut may be manufactured by a different vendor. For example, one vendor may design the mechanical structure for the landing gear strut while another vendor may design the control system. Moreover, when the landing gear strut is designed and tested, yet another company may be contracted to install the landing gear strut into the landing gear assembly in the aircraft.

Currently, each vendor that designs or manufactures a different component in an aircraft uses its own design system to design and manufacture that component. These design systems may be different between vendors. The lack of integration of the design systems used by vendors may cause the design and manufacture of an aircraft to be more time-consuming and tedious than desired. For example, when an aircraft manufacturer coordinates development of the aircraft, many vendors must supply design models and installation specifications. These design models and installation specifications may not be in a format usable by the manufacturer of the aircraft.

In other words, a vendor that manufactures a component may not be able to use the designs generated by a particular computer aided design system from the vendor designing the component. When the designs for these components are needed by the aircraft manufacturer or another vendor, using files may be more difficult if the aircraft manufacturer or other vendor does not use the same design software.

For example, at some time during the design and manufacturing process, two vendors may contact each other to discuss the integration of components for the landing gear strut within the aircraft. To do so, computer aided design models used with one type of design software by a first vendor may be transformed to a format used with a second type of design software used by the second vendor in order to be viewed and manipulated by the second vendor.

This exchange and transformation of information for components may be more tedious and time-consuming than desired. Further, if simulations for the components designed by the first vendor and the second vendor are performed by a third vendor, this third vendor may be unable to perform simulations using the models generated by the first vendor and the second vendor without transformations. Conversions of the models may be needed to place the models in the format usable by the simulation software used by the third vendor.

Additionally, if modifications need to be made in light of the integration of components to form a component, such as the landing gear assembly, the model used by the second vendor is transformed back to the format used by the first type of software to be viewed and modified by the first vendor. This process repeats itself until each component reaches the desired parameters for the aircraft.

In particular, an aircraft manufacturer of produces complex products. For example an aircraft may have millions of components. The components may be designed, manufactured, and assembled by hundreds of vendors. This type of interaction between the vendors and the aircraft manufacturer may be extremely complex and difficult to perform.

For example, the large amount of data may be exchanged when the aircraft manufacturer and vendors communicate with each other in developing the aircraft. Accurate transmission of information, such as many terabytes of data may be exchanged over short periods of time. This communication occurs over networks, including the Internet. Accuracy in the exchange of information is needed.

This complexity is increased through the use of different software programs, hardware, network architectures, websites, file types, databases, and other constructs used to by the aircraft manufacturer and the vendors communicate with each other.

Further, the evolution of the design of parts for the aircraft and the aircraft itself often occurs during the product development process. These and other changes, such as those requested by customers, may result even more exchange of information. Thus, this process takes more time and may be more costly than desired.

Therefore, it would be desirable to have a method and apparatus that takes into account at least some of the issues discussed above, as well as other possible issues.

SUMMARY

In one illustrative embodiment, a product development environment comprises a system. The system further comprises a virtual product online world manager and a transformer. The virtual product online world manager is configured to manage elements for a product under development in a virtual product online world. The transformer is configured to exchange the elements with a number of product development systems developing the elements over a network.

In another illustrative embodiment, a product development environment comprises a virtual product online world manager, a transformer, a security manager, a work structure manager, and a product structure manager. The virtual product online world manager is configured to manage elements for a vehicle under development in a virtual vehicle online world. The transformer is configured to exchange the elements with product development systems developing the elements over a network. The transformer is further configured to transform an element in the elements received in a foreign format from a product development system in the product development systems into a master format used in the virtual product online world. The transformer is further configured to transform the element in the master format into the foreign format for transmission to the product development system. The security manager is configured to manage information in the elements exchanged with the product development systems based on a security policy. The work structure manager is configured to manage assignment of work for developing the vehicle. The product structure manager is configured to manage a hierarchy of the elements for the vehicle.

In yet another illustrative embodiment, a product development environment comprises virtual product online worlds. Each virtual product online world in the virtual product online worlds comprises a virtual product online world manager configured to manage elements for a product under development in the product development environment and a transformer configured to exchange the elements with a selected virtual product online world in the virtual product online worlds developing the elements over a network. The transformer is further configured to transform an element in the elements received in a foreign format from the selected virtual product online world into a master format used in the each virtual product online world. The transformer is further configured to transform the element in the master format into the foreign format for transmission to the selected virtual product online world.

In still another illustrative embodiment, a method for developing a product is provided. Elements are stored in a virtual product online world. The elements are exchanged with a number of product development systems through an integration hub connected to a network. The number of product development systems is configured to develop the elements for the product.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 11 is an illustration of an aircraft manufacturing and service method in accordance with an illustrative embodiment; and FIG. 12 is an illustration of an aircraft in accordance with an illustrative embodiment.

DETAILED DESCRIPTION

Figure 1:
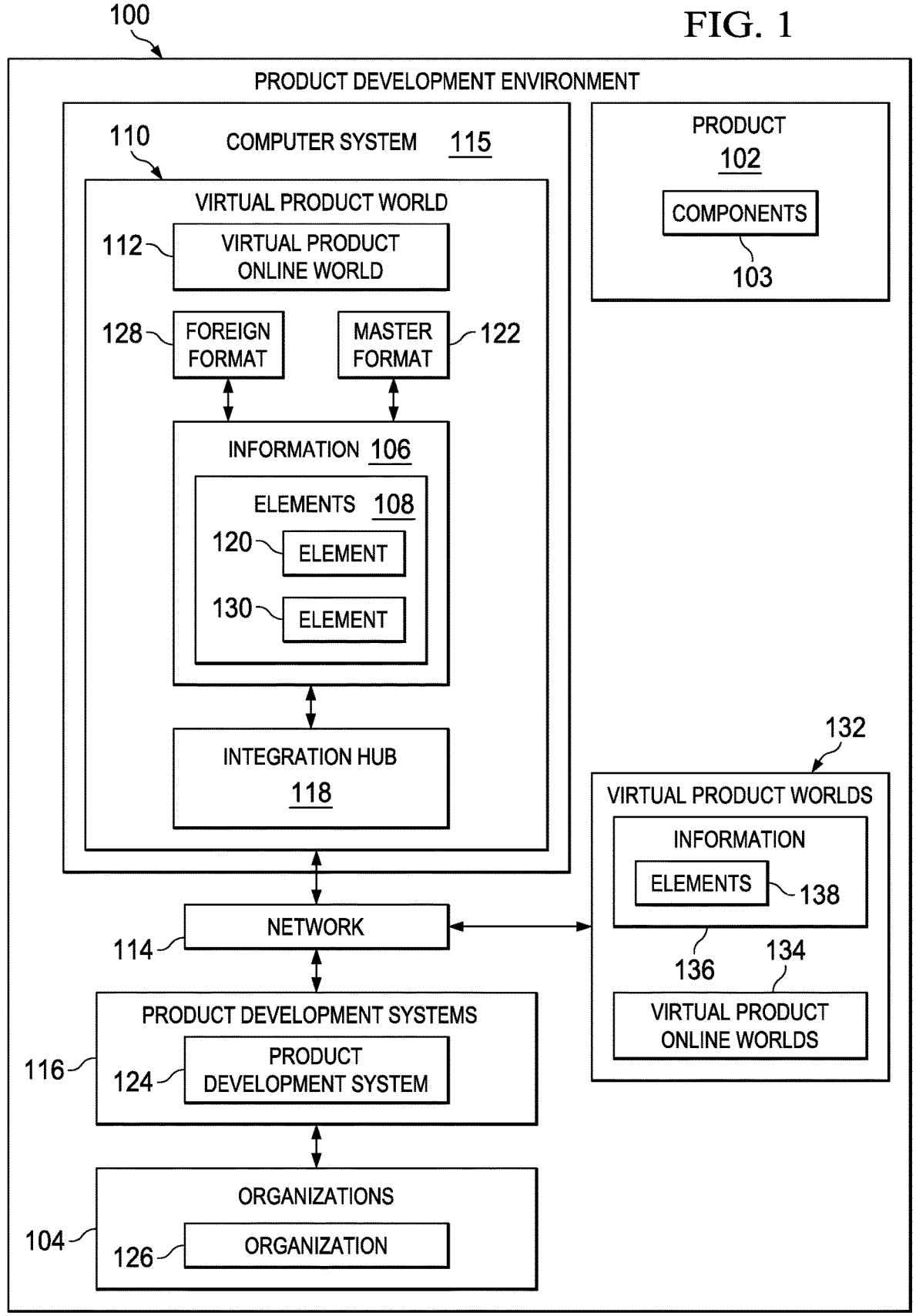
FIG. 1 is an illustration of a block diagram of a product development environment in accordance with an illustrative embodiment.

The illustrative embodiments recognize and take into account one or more different considerations. For example, the illustrative embodiments recognize and take into account that when developing a product, multiple organizations may be involved in the product development. For example, one organization may be the main or primary developer of the product while other organizations may be vendors that provide support for different components of the product.

The illustrative embodiments also recognize and take into account that sharing information between the different organizations may be more difficult than desired. For example, the illustrative embodiments recognize and take into account that different organizations may employ different types of development tools.

In one illustrative example, these development tools may take the form of computer aided design (CAD) tools. These computer aided design tools may be proprietary between different organizations. As a result, exchanging information between different organizations may be more difficult than desired.

For example, two secondary organizations may exchange information for developing components that may interact with each other or may be connected to each other. Further, during different phases of development, the information for these components may be sent back to the primary organization.

The illustrative embodiments recognize and take into account that the transformation of information from one format to another format may be more difficult than desired and multiple transformations may be performed based on what development systems are used by the different organizations working on the product. One solution may be to require vendors to use development tools that support formats selected by the primary organization. This type of requirement, however, may be more onerous than desired. Such a requirement may result in a loss or inability to use vendors that are able to design, manufacture, or design and manufacture components at a desired level of performance. Further, such a requirement may result in the use of vendors that are more costly than desired.

The illustrative embodiments also recognize and take into account that these organizations may be analogous to users of massive multi-player online game environments. In a massive multi-player online game environment, different users share and use information within a particular world. The illustrative embodiments recognize and take into account that a virtual product online world may be created to allow for sharing of information between different organizations as users of the virtual product online world.

Thus, the illustrative embodiments provide an environment that may be used for product development. In one illustrative embodiment, a product development environment may provide a virtual product online world. This product development environment may include a virtual product online world manager and a transformer. The virtual product online world manager is configured to manage elements for a product under development in a virtual product online world.

The transformer is configured to exchange elements with product development systems developing the elements over a network. The transformer is further configured to transform an element in the elements received in a foreign format from a product development system in the product development systems into a master format used in the virtual product online world. Further, the transformer also is configured to transform the element in the master format into the foreign format for transmission to the product development system.

With reference now to the figures and, in particular, with reference to FIG. 1, an illustration of a block diagram of a product development environment is depicted in accordance with an illustrative embodiment. Product development environment 100 is an example of an environment that may be used to develop product 102. Product development environment 100 is a system that includes systems and/or other components used in developing products, such as product 102.

In this illustrative example, organizations 104 may collaborate with each other within product development environment 100 to develop product 102. An organization in organizations 104 may be any entity that participates in the development of a product. For example, a vendor may be an aircraft manufacturer, a ship builder, a supplier of components for a product, a business that tests designs and components, and other types of entities that may contribute towards the development of product 102.

As depicted, product 102 is comprised of a number of components 103. Components 103 are assembled to form product 102 in these illustrative examples. For example, different organizations within organizations 104 may be responsible for different components in components 103 for product 102. For example, one organization in organizations 104 may design a mechanical structure for a component in components 103 while another organization in organizations 104 may design the control system for the same component in components 103.

Information 106 about components 103 for product 102 is exchanged between organizations 104 in developing product 102 in these illustrative examples. In developing product 102, development activities may take a number of different forms.

For example, the development of product 102 may be, for example, at least one of creating product 102, upgrading product 102, revising product 102, integrating product 102 with other products, and other types of development activities. In other words, the development of product 102 may occur throughout the life cycle of product 102. For example, development activities may be conducted during the creation of product 102, the testing of product 102 prior to releasing product 102, while product 102 is in service, and other parts of the life cycle of product 102.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

In particular, organizations 104 may exchange information 106 in the development of product 102. For example, information 106 may include elements 108 for product 102. An element in elements 108 is a virtual representation of a component in components 103. In other words, components 103 are physical objects, while elements 108 are virtual representations of those physical objects. Additionally, elements 108 may include other information used to manufacture components 103 and to simulate, view, test, or otherwise manipulate elements 108.

For example, without limitation, if product 102 takes the form of an aircraft, elements 108 may be virtual representations of at least one of a fuselage, a wing box, an engine, an in-flight entertainment system, a landing gear system, a tire, a strut, a bulk head, an autopilot system, an aircraft networking data processing system, a navigation system, a number of monuments, and other suitable components in components 103.

In these illustrative examples, elements 108 are virtual objects. In other words, elements 108 are not physical objects that are touched or actually used in product 102. Instead, elements 108 are pieces of information that represent the physical forms of elements 108.

Additionally, information 106 may include other types of information in addition to or in place of elements 108. For example, information 106 may include financial information about product 102, promotional materials, marketing materials, and other information for product 102 that may not consist of elements 108 that form product 102.

In these illustrative examples, organizations 104 may access virtual product world 110 to exchange information 106, such as elements 108, in developing product 102. Virtual product world 110 may take the form of virtual product online world 112. In particular, virtual product online world 112 is accessible by users, such as organizations 104, via network 114.

As depicted, virtual product world 110 may be implemented in computer system 115. Computer system 115 is one or more computers. When more than one computer is present, those computers may be in communication with each other using a communications medium such as a network. This network of computers in computer systems 115 may be connected to network 114 in these illustrative examples.

Network 114 may take a number of different forms. For example, network 114 may be comprised of one or more different types of networks. In other words, network 114 may be formed from multiple networks that may be in communication with each other. For example, without limitation, network 114 may include at least one of a wide area network, a local area network, an intranet, the Internet, and other suitable types of communications mediums.

In these illustrative examples, organizations 104 employ product development systems 116 to develop product 102. In particular, organizations 104 may use product development systems 116 to develop elements 108 for product 102.

The development of elements 108 may involve different activities. For example, the development of elements 108 may include at least one of designing elements 108, testing elements 108, evaluating elements 108 to see whether elements 108 meet desired performance parameters, evaluating elements 108 to identify costs and other information, and other development activities. One or more of these different development activities may comprise the process of developing elements 108.

In these illustrative examples, product development systems 116 may use different formats and may not interchange information 106 between each other as easily as desired. For example, one product development system in product development systems 116 may use a different format for designs than other product development systems in product development systems 116. The exchange of information 106 between product development systems 116 may be made easier through the use of integration hub 118.

In these illustrative examples, integration hub 118 is present in virtual product world 110. Integration hub 118 is configured to facilitate the exchange of information 106 between organizations 104. In particular, integration hub 118 may facilitate the exchange of elements 108 between different product development systems 116.

In this illustrative example, integration hub 118 may be implemented in software, hardware, or a combination of the two. When software is used, the operations performed by the components may be implemented in program code configured to be run on a processor unit. When hardware is employed, the hardware may include circuits that operate to perform the operations in the components.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

In these illustrative examples, elements 108 are stored in master format 122. Master format 122 is a format selected for elements 108 and other information in information 106. Master format 122 is a format selected for use by integration hub 118 to store elements 108 in virtual product online world 112. In other words, master format 122 is a transformable file format used in virtual product online world 112. Master format 122 may or may not be directly useable by a software application depending on the implementation.

In exchanging elements 108 between product development systems 116 used by organizations 104, integration hub 118 will transform elements 108 from master format 122 into the appropriate format used by each product development system in product development systems 116.

For example, element 120 in elements 108 may be developed by product development system 124 in product development systems 116 within organization 126 in organizations 104. When element 120 is sent from product development system 124 in organization 126 to integration hub 118, element 120 has foreign format 128.

In these illustrative examples, foreign format 128 is a format for information in organization 126 that is used by organization 126 to manage element 120. Foreign format 128 may not be a native format used by software applications in product development systems 116 although foreign format 128 may be supported by the software applications in product development systems 116. For example, a software application in product development systems 116 may create, edit, publish, or otherwise process a file using a native file format. The file for element 120 may be transformed into foreign format 128 for use by other software applications in product development systems 116. In some illustrative examples, foreign format 128 may be a native format.

Integration hub 118 is configured to change element 120 from foreign format 128 to master format 122 for inclusion in virtual product world 110. In a similar fashion, if organization 126 requests access to element 130, integration hub 118 transforms element 130 from master format 122 into foreign format 128 for use by product development system 124 in organization 126.

In this manner, integration hub 118 provides access to virtual product online world 112 to perform at least one of a design, test, evaluation, visualization, navigation, access, verification, conversion, validation, manipulation, management, control, integration, and analyzing function. Of course, integration hub 118 may provide access to virtual product online world 112 to perform other functions depending on the particular implementation.

Additionally, product development environment 100 also may include a number of virtual product worlds 132. "A number of", as used herein with reference to an item, means one or more items. For example, a number of virtual product worlds 132 is one or more virtual product worlds 132. As depicted, the number of virtual product worlds 132 is in communication with network 114. In other words, virtual product worlds 132 may be accessible through network 114 in these illustrative examples.

As depicted, virtual product worlds 132 are virtual product online worlds 134 that are accessible by users through network 114. In these illustrative examples, virtual product worlds 132 are a type of product development system, such as a product development system in product development systems 116. Each virtual product world in virtual product worlds 132 may be used by an organization within organizations 104.

In these illustrative examples, virtual product worlds 132 may contain information 136 such as elements 138. Elements 138 may be elements that are also part of product 102 in these illustrative examples.

Thus, product 102 may be developed through the use of virtual product world 110 accessed by organizations 104. In other illustrative examples, product 102 may be developed through the interaction of virtual product world 110 with other product development systems in the form of a number of virtual product worlds 132.

Although the illustrative examples below describe product 102 as being an aircraft and a submarine, product 102 may take many different forms other than the specific ones described herein. For example, other illustrative embodiments may be applied to other types of products in which product 102 may be a mobile platform, a stationary platform, a land-based structure, an aquatic-based structure, and a space-based structure. More specifically, product 102 may be, for example, a surface ship, a tank, a personnel carrier, a train, a spacecraft, a space station, a vehicle, an automobile, a satellite, a submarine, a motorcycle, an appliance, a power plant, a bridge, a dam, a manufacturing facility, a building, an engine, an auxiliary power unit, a fuel tank, a mobile phone, a computer, a printed circuit board, a spreadsheet program, a word processing program, a fuselage, a wing, a network, and other suitable types of products.

Figure 2:
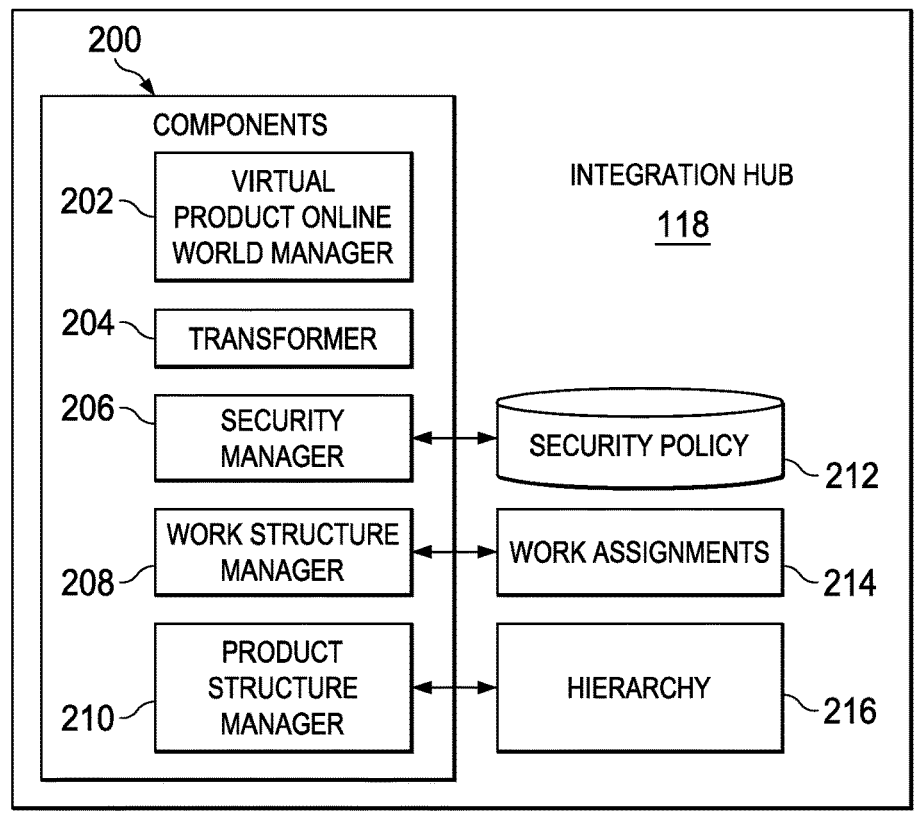
FIG. 2 is an illustration of a block diagram of an integration hub in accordance with an illustrative embodiment.

With reference now to FIG. 2, an illustration of a block diagram of an integration hub is depicted in accordance with an illustrative embodiment. As depicted, integration hub 118 may include a number of components 200 that facilitate the exchange of information 106 between different organizations in organizations 104 in FIG. 1. Additionally, one or more of components 200 also may be configured to manage information 106.

As depicted, integration hub 118 includes at least one of virtual product online world manager 202, transformer 204, security manager 206, work structure manager 208, product structure manager 210, and other suitable components.

Virtual product online world manager 202 is configured to manage elements 108 for product 102 during development in virtual product world 110 in FIG. 1. Transformer 204 is configured to exchange elements 108 with product development systems 116 developing elements 108 over network 114 in FIG. 1. As another example, transformer 204 may also exchange elements 108 with other virtual product worlds, such as one or more of virtual product worlds 132 in FIG. 1.

Additionally, transformer 204 also is configured to transform element 120 received in foreign format 128 into master format 122 used in virtual product world 110. Further, transformer 204 also is configured to transform element 130 from master format 122 into foreign format 128 for transmission to product development system 124 in FIG. 1. Of course, transformer 204 may be configured to transform other elements 108 into master format 122, foreign format 128, or some other suitable format for information 106 in elements 108 in FIG. 1.

In this illustrative example, security manager 206 is configured to manage information 106 in elements 108 exchanged with product development systems 116 based on security policy 212. Security manager 206 may be used to implement various rules from security policy 212 with respect to the manner in which information 106 is handled by different organizations in organizations 104. For example, information 106 that is allowed to be shared through elements 108 to different organizations in organizations 104 may be based on various rules.

These rules may be based on contracts or other agreements that may be in place between organizations within organizations 104. Further, the location of organizations 104 also may limit what pieces of information 106 are included in elements 108 for different organizations in organizations 104. This limitation may be based on government rules and regulations or other policies that may be implemented in security policy 212. For example, security policy 212 may enforce rules selected from at least one of International Traffic in Arms Regulations, Export Administration Regulations, intellectual property regulations, access control lists, and other suitable types of security policies.

Additionally, security manager 206 also may be configured to encrypt elements 108. For example, security manager 206 may use security policy 212 to identify whether an encryption is to be used and the type of encryption to be used. The type of encryption used may depend on the location of an organization, regulations, contract provisions, and other factors. The type of encryption may vary for different organizations in organizations 104.

Work structure manager 208 is configured to manage work assignments 214 for product 102. In particular, work structure manager 208 may identify and manage what work is to be performed by different organizations in organizations 104 in developing elements 108 for product 102. Work assignments 214 may include timelines as well as responsibilities. Further, work assignments 214 may also include financial information about product 102 in these illustrative examples.

Product structure manager 210 is configured to manage hierarchy 216 of elements 108 for product 102. Product structure manager 210 may be used to identify where different elements in elements 108 are located with respect to other elements in elements 108 for product 102. For example, product structure manager 210 may manage the location of a landing gear structure relative to the fuselage of the aircraft.

Hierarchy 216 is an organization of elements 108 relative to each other. Hierarchy 216 identifies where a particular element in elements 108 is located relative to other elements.

Different elements in elements 108 may be located on different levels in hierarchy 216. An element in elements 108 may be an assembly of other elements. The elements forming that assembly are on a lower level in hierarchy 216 in these illustrative examples.

For example, some elements in elements 108 may make up or form other elements in elements 108. In yet other illustrative examples, some elements in elements 108 may be connected to or work with other elements in elements 108. Thus, elements on the lowest level of hierarchy 216 may be combined or associated with other elements on the lowest level of hierarchy 216 to form more complex elements on the next level of hierarchy 216. In other words, product structure manager 210 manages all levels of hierarchy 216 up to the top level, which may be a completely assembled structure such as an aircraft.

Figure 3:
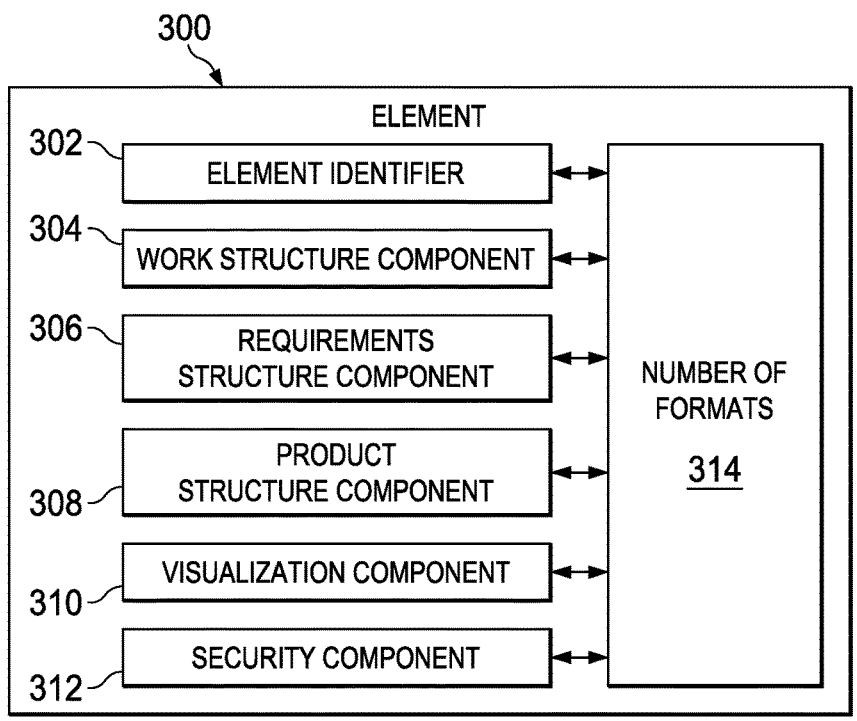
FIG. 3 is an illustration of a block diagram of an element in accordance with an illustrative embodiment.

With reference next to FIG. 3, an illustration of a block diagram of an element is depicted in accordance with an illustrative embodiment. Element 300 is an example of an element in elements 108 in FIG. 1. As depicted, element 300 includes at least one of element identifier 302, work structure component 304, requirements structure component 306, product structure component 308, visualization component 310, and security component 312.

Element identifier 302 identifies the element. Element identifier 302 may be a name of the element. In some cases, element identifier 302 may be a unique identifier. In yet other illustrative examples, element identifier 302 may include a name and a unique identifier depending on the particular implementation.

Work structure component 304 identifies a work assignment for element 300. In other words, work structure component 304 may identify what organization or organizations are developing element 300. Work structure component 304 also may identify a location of element 300 in a program for developing the product. In other words, work structure component 304 identifies where element 300 fits into the overall plan for developing a product.

Requirements structure component 306 identifies requirements for element 300. These requirements may be in the form of a specification for element 300. This specification may be, for example, a technology specification. Requirements structure component 306 may include desired performance parameters for element 300. These parameters may include parameters about the performance of element 300, the materials used for element 300, and other suitable information. For example, without limitation, requirements structure component 306 may identify desired parameters such as load, operating temperature, dimensions, materials, functions, and other information about element 300.

Product structure component 308 identifies a location of element 300 within the product. Product structure component 308 may identify, for example, where element 300 is located with respect to other elements. For example, if element 300 is a window, product structure component 308 may identify where the window is located. For example, the window may be located on another element such as a door or a fuselage. This location may be described using a hierarchical structure, coordinates, or in some other suitable fashion.

Visualization component 310 includes information used to display element 300. For example, visualization component 310 includes information used to view element 300 on any computer system. In other words, the information may be used to display element 300 on a display device. In these illustrative examples, the information may be used to generate a three-dimensional display. Thus, visualization component 310 may be used to display element 300 such that an operator may see element 300. The display device used to display two-dimensional or three-dimensional representations of element 300 may be one of, for example, without limitation, a computer system, a tablet, a mobile device, or some other suitable type of display device.

In these illustrative examples, visualization component 310 may include information used by a product development system such as a computer aided design tool to display element 300 to an operator. Thus, visualization component 310 may include a computer aided design model that is configured for use by a computer aided design system.

Security component 312 identifies security requirements for element 300. For example, security component 312 may identify restrictions on the distribution or use of element 300. Further, security component 312 also may include encryption of the other components in element 300. In this manner, element 300 may be distributed in a secure manner.

Security component 312 also may take the form of encryption applied to other components in element 300. When security component 312 takes the form of encryption of the other components in element 300, security component 312 may be viewed more as a wrap or a layer around the other components.

Further, the different components in element 300 may have number of formats 314. Each particular component may have a different format in number of formats 314 depending on the particular product development system that would use element 300. Number of formats 314 are tailored to a specific product development system or number of product development systems. For example, one product development system may have one format in number of formats 314, while another product development system may have a different format in number of formats 314. The use of different formats in number of formats 314 for the components in element 300 allows different product development systems to communicate with each other about the development of a product, such as product 102 in FIG. 1.

Figure 4:
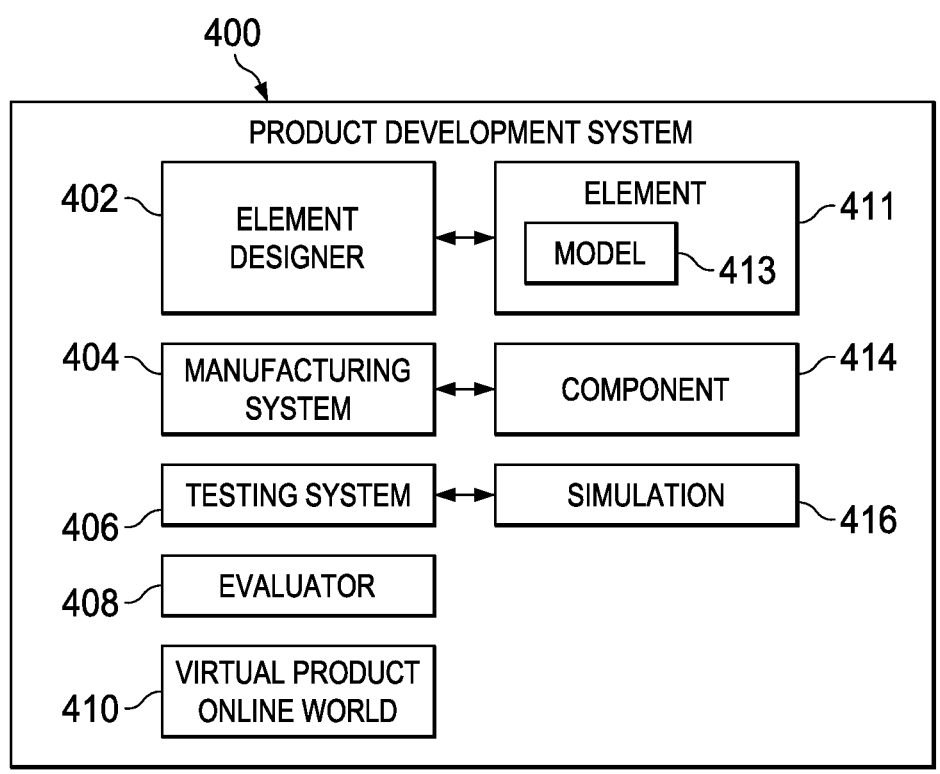
FIG. 4 is an illustration of a block diagram of a product development system in accordance with an illustrative embodiment.

Turning now to FIG. 4, an illustration of a block diagram of a product development system is depicted in accordance with an illustrative embodiment. Product development system 400 is an example of a product development system in product development systems 116 in FIG. 1.

As depicted, product development system 400 may be at least one of element designer 402, manufacturing system 404, testing system 406, evaluator 408, virtual product online world 410, and other suitable types of product development systems. In other words, product development system 400 may be any one of these types of systems but may include multiple systems of the same or different types depending on the particular implementation.

When product development system 400 includes element designer 402, product development system 400 may be used to design various aspects of an element. Element designer 402 may be used to generate model 413 in element 411.

Element designer 402 may be a computer aided design system, a technology computer aided design system, and other suitable types of designers. A computer aided design system may be a computer based system that is used to assist in the creation, modification and analysis, or optimization of a design for element 411.

When element designer 402 is a technology computer aided design system, element designer 402 may be used to design an element in the form of a circuit, a semiconductor, or some other device. Further, a technology computer aided design system also may be used to design processes to create the circuit or semiconductor.

Manufacturing system 404 is used to create a physical or real world form of element 411. In other words, manufacturing system 404 is configured to manufacture component 414. In manufacturing component 414, manufacturing system 404 may receive an element that includes information used to manufacture component 414.

For example, manufacturing system 404 may be used to generate code for a software component. The software component may be, for example, a control law, navigation software, and other types of software components.

In another example, model 413 in element 411 may be used to manufacture a physical form of the element for the product. For example, manufacturing system 404 may use model 413 to manufacture physical components such as, for example, without limitation, a landing gear assembly, an in-flight entertainment system, a lighting system, a tube, a ventilation system, a wing, a wing box, a bulkhead, and other suitable components in physical form.

Manufacturing system 404 may take various forms. For example, manufacturing system 404 may be at least one of a metal working system, a composite structure manufacturing system, a semiconductor fabrication system, a program code generation system, and other types of systems that may be used to generate physical forms of an element for use in a product.

Testing system 406 is configured to perform tests on both element 411 and component 414 manufactured using element 411. For example, testing system 406 may use model 413 to run simulation 416 on element 411. Simulation 416 may simulate element 411 under different conditions. For example, simulation 416 may simulate loads, temperatures, pressures, moisture, and other conditions to test the performance of element 411 under these conditions.

Additionally, testing system 406 may be used to actually test a physical form of the element 411 to determine whether the element performs as desired. For example, testing system 406 may perform tests on component 414 to evaluate element 411.

Evaluator 408 may be used to perform evaluations of element 411. Evaluator 408 may evaluate the performance level of element 411, the cost for element 411, and other suitable economic factors that may be desirable in determining whether an element is economically feasible for use in a product as designed.

When product development system 400 takes the form of virtual product online world 410, product development system 400 may act as a repository in management of elements for the product. In these illustrative examples, virtual product online world 410 may exchange elements with other virtual product online worlds.

Figure 5:
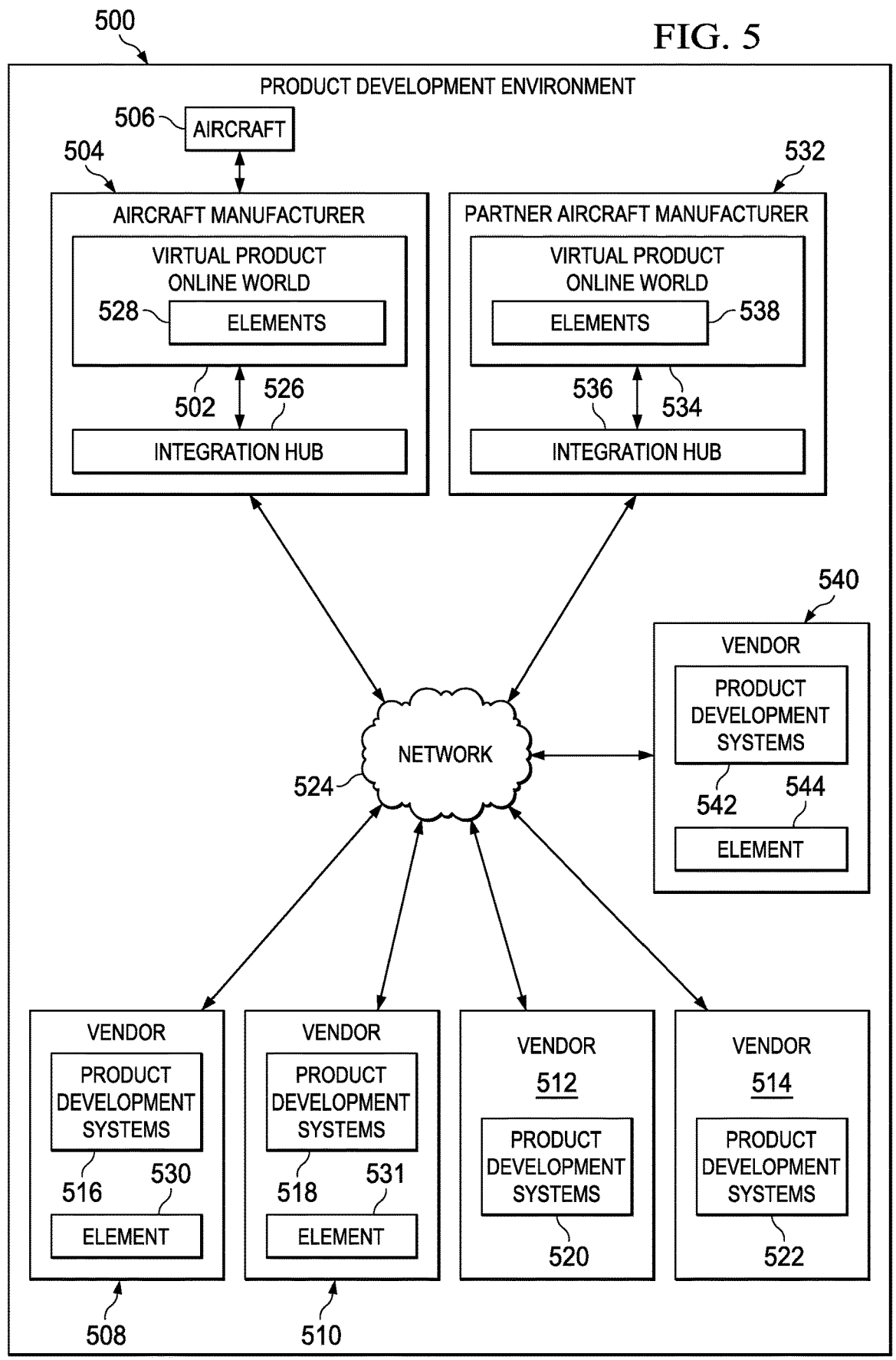
FIG. 5 is an illustration of a block diagram of a product development environment in accordance with an illustrative embodiment.

Turning now to FIG. 5, an illustration of a block diagram of a product development environment is depicted in accordance with an illustrative embodiment. Product development environment 500 is an example of an implementation for product development environment 100 in FIG. 1. As depicted, virtual product online world 502 is managed by aircraft manufacturer 504. In these illustrative examples, aircraft manufacturer 504 develops aircraft 506. Aircraft 506 is a new aircraft in this illustrative example. In other illustrative examples, development of aircraft 506 may involve at least one of upgrading, refurbishing, modifying, or otherwise changing an existing design of an aircraft to form aircraft 506.

In these illustrative examples, aircraft manufacturer 504 may work with vendor 508, vendor 510, vendor 512, and vendor 514 in the development of aircraft 506. Although four vendors are shown here, other numbers of vendors may be present in the development of aircraft 506. For example, aircraft manufacturer 504 may work with 10 vendors, 45 vendors, 200 vendors, or some other number of vendors to develop aircraft 506.

As depicted, vendor 508 has product development systems 516, vendor 510 has product development systems 518, vendor 512 has product development systems 520, and vendor 514 has product development systems 522. Of course, in some cases a vendor may only have a single product development system depending on the implementation.

In this illustrative example, these product development systems and these vendors may access virtual product online world 502 through network 524. As depicted, access to virtual product online world 502 occurs through integration hub 526 via network 524. In this illustrative example, integration hub 526 provides access to elements 528 in virtual product online world 502. In this manner, a vendor, such as vendor 508, may develop an element, element 530, and send that element to virtual product online world 502 for inclusion in elements 528 for aircraft 506. Element 530 generated by product development system 516 at vendor 508 may not have the same format as elements 528 in virtual product online world 502. Integration hub 526 changes the format of element 530 sent by vendor 508 to a format used by elements 528 in virtual product online world 502.

Further, vendor 508 may provide element 530 for use by product development systems 518 at vendor 510. Element 530 is sent to integration hub 526 and placed into virtual product online world 502. Vendor 510 may then obtain element 530 from virtual product online world 502. Integration hub 526 formats element 530 into a format usable by product development systems 518 at vendor 510.

Vendor 510 may use product development systems 518 to make modifications or changes to element 530. In other illustrative examples, vendor 510 may perform other operations on element 530 such as testing, simulations, manufacturing components, or other suitable operations. Further, vendor 510 may use element 530 to develop element 531.

In other illustrative examples, aircraft manufacturer 504 also may work with partner aircraft manufacturer 532 in developing aircraft 506. Partner aircraft manufacturer 532 may have virtual product online world 534 in which access is provided by integration hub 536. Of course, additional aircraft manufacturers may be present that work together to develop aircraft 506.

In this illustrative example, elements 538 in virtual product online world 534 may be elements in addition to elements 528 in virtual product online world 502 for aircraft 506. For example, partner aircraft manufacturer 532 may provide elements 538 in aircraft 506, while aircraft manufacturer 504 provides elements 528 for aircraft 506. For example, elements 538 from partner aircraft manufacturer 532 may be propulsion systems, electrical systems, environmental systems, and a tail section for aircraft 506. Elements 528 from aircraft manufacturer 504 may be elements for other components of aircraft 506 such as the other portions of the fuselage, wings, fuel tanks, fuel systems, hydraulic systems, and other components. Of course, in some cases, elements 528 may include some of elements 538 depending on the particular implementation.

In these illustrative examples, vendor 540 has product development systems 542. Vendor 540 may generate element 544 for inclusion or use within elements 538 in virtual product online world 534. In these illustrative examples, vendor 510 also may access virtual product online world 534 through integration hub 536 at partner aircraft manufacturer 532 depending on the particular implementation.

Thus, product development environment 500 allows for the integration of elements from a number of vendors and a number of manufacturers. In this manner, the development of components in aircraft 506 may be completed more efficiently.

Figure 6:
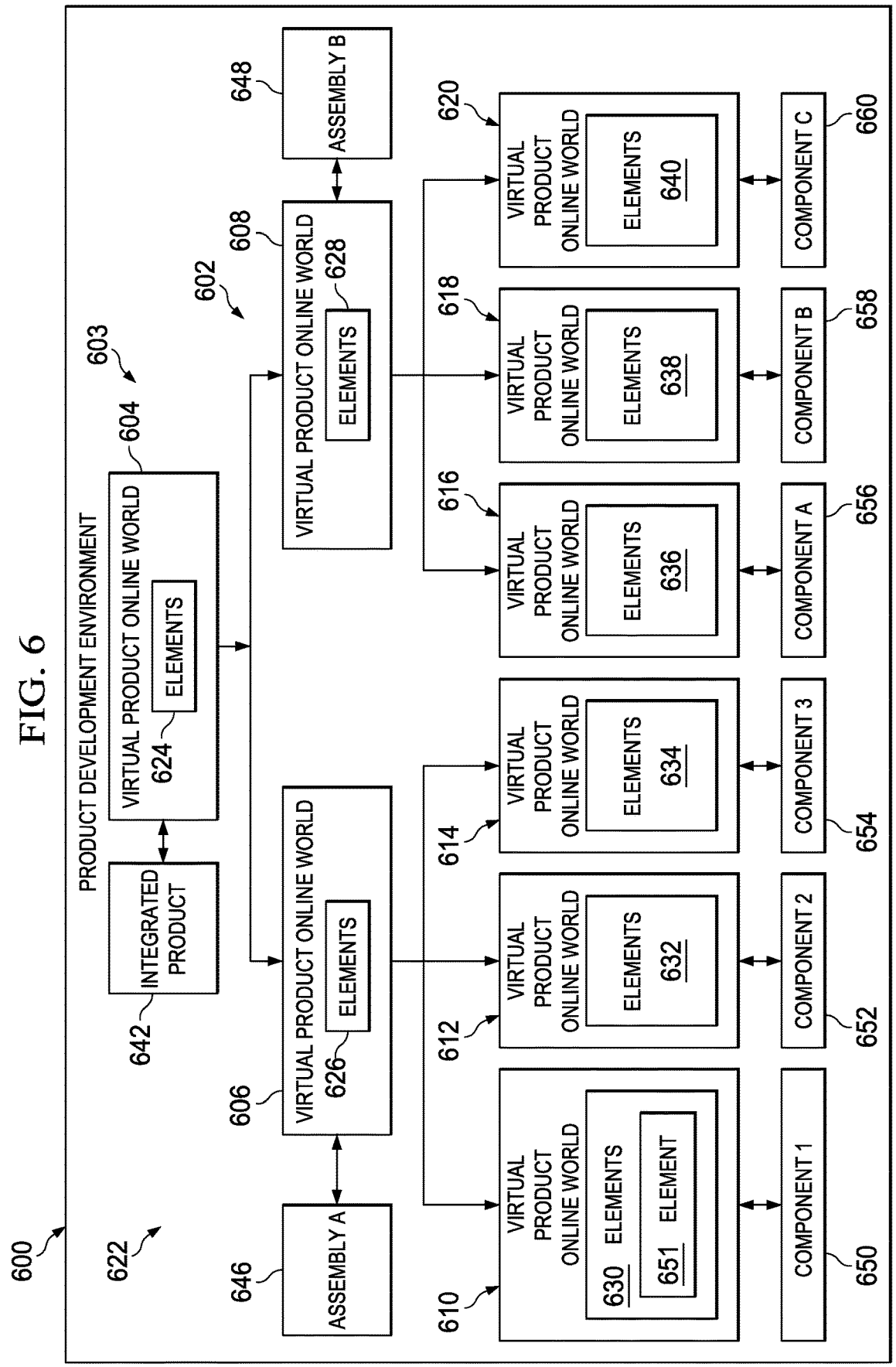
FIG. 6 is an illustration of a block diagram of a hierarchy of elements for a product in a product development environment in accordance with an illustrative embodiment.

Turning next to FIG. 6, an illustration of a block diagram of a hierarchy of elements for a product in a product development environment is depicted in accordance with an illustrative embodiment. In this illustrative example, product development environment 600 is an example of an implementation of product development environment 100 in FIG. 1.

Product development environment 600 includes virtual product online worlds 602 arranged in hierarchy 603. In particular, virtual product online worlds 602 include virtual product online world 604, virtual product online world 606, virtual product online world 608, virtual product online world 610, virtual product online world 612, virtual product online world 614, virtual product online world 616, virtual product online world 618, and virtual product online world 620. In the illustrative examples, each of these virtual product online worlds may be part of an organization.

In this illustrative example, elements 622 are located in virtual product online worlds 602 and arranged in hierarchy 603 of virtual product online worlds 602.

For example, elements 624 are located in virtual product online world 604. Elements 626 and elements 628 are located in virtual product online world 606 and virtual product online world 608, respectively. Elements 630, elements 632, and elements 634 are located in virtual product online world 610, virtual product online world 612, and virtual product online world 614, respectively. Elements 636, elements 638, and elements 640 are located in virtual product online world 616, virtual product online world 618, and virtual product online world 620, respectively.

As depicted, the information for a product may be distributed throughout virtual product online worlds 602. In other words, elements in some virtual product online worlds in virtual product online worlds 602 may not be found in other virtual product online worlds in virtual product online worlds 602.

For example, elements 624 in virtual product online world 604 are elements for integrated product 642. Integrated product 642 is at the top of hierarchy 603. This top of hierarchy 603 may also be referred to as the first level or root of hierarchy 603.

Elements 626 in virtual product online world 606 are elements for assembly A 646 in integrated product 642. Elements 628 in virtual product online world 608 are elements for assembly B 648 in integrated product 642. Assembly A 646 and assembly B 648 may be the second level of the hierarchy. Assembly A 646 and assembly B 648 may form integrated product 642.

Elements 630 in virtual product online world 610 are elements for component 1 650 in assembly A 646. Elements 632 in virtual product online world 612 are elements for component 2 652 in assembly A 646. Elements 634 in virtual product online world 614 are elements for component 3 654 in assembly A 646.

In a similar fashion, elements 636 are elements for component A 656 in assembly B 648. Elements 638 are elements for component B 658 in assembly B 648. Elements 640 are elements for component C 660 in assembly B 648. Component 1 650, component 2 652, component 3 654, component A 656, component B 658, and component C 660 may comprise the third level of hierarchy 603.

In hierarchy 603, the different elements illustrated in the different virtual product online worlds may not be present in all of the virtual product online worlds. Only elements needed for a higher level in hierarchy 603 are included in that particular virtual product online world.

For example, component 1 650 may be a printed circuit board for use in assembly A 646, which may be an in-flight entertainment display system. Elements 630 are an assembly of elements for the printed circuit board represented by component 1 650 and may include, for example, without limitation, a board, resisters, capacitors, switches, and other components that may be found on the printed circuit board. Element 651 in elements 630 represents the assembly of the different elements in elements 630 that form component 1 650, the printed circuit board.

Elements 626 representing the in-flight entertainment display system may only include element 651 in elements 630 representing the printed circuit board and not the other elements in elements 630 that represent all of the components forming element 651, the printed circuit board. Element 651 may include the information needed for assembly A 646 but may not include other information that is unnecessary for the manufacture of the in-flight entertainment display system.

In other words, virtual product online world 606 only needs element 651, representing component 1 650, the printed circuit board. The other elements in elements 630 that form component 1 650 are not included in virtual product online world 606.

In other words, virtual product online world 606 has a particular level or granularity that does not include the details for virtual product online world 610. All of the elements in virtual product online world 610, virtual product online world 612, and virtual product online world 614 are not needed in this particular example because virtual product online world 606 relies on elements representing component 1 650, component 2 652, and component 3 654 for Assembly A 646 being provided from other organizations. In this manner the elements 624 making up integrated product 642 may be distributed throughout the virtual product online worlds 602 and organized in hierarchy 603.

In other illustrative examples, a virtual product world may design, manufacture, or assemble more than one product. For example, virtual product online world 610 may have elements 630 for component 1 650 and a component 1A. In other illustrative examples, virtual product online world 610 may have elements 630 for component 1 650, a component 1A, a component 1B, and/or other components. Of course, other numbers of components may be designed using elements in one virtual product online world or a combination of elements from a number of virtual product online worlds in these illustrative examples.

In still other illustrative examples, an operator may request more details from one level of hierarchy 603. For example, while only element 651 may be needed by assembly A 646 to provide the desired granularity of component 1 650, an operator may request additional details about elements 630 of component 1 650, depending on the particular implementation. In other words, an operator may move between levels of the hierarchy to view a particular level of granularity for components in hierarchy 603.

In some illustrative examples, the ability of an operator to move through the different levels of hierarchy 603 may depend on a security component such as security component 312 in FIG. 3. Much like a user moves through "levels" of a virtual gaming environment, an operator may move through levels of hierarchy 603 in product development environment 600. If a particular operator does not have clearance to access a certain level of hierarchy 603, that operator may not view additional details about components in another level of hierarchy 603.

Although product development environment with hierarchy 603 is shown with three levels of hierarchy 603, more levels may be present in an illustrative embodiment. For example, 5 levels, 29 levels, or 100 levels may be present for hierarchy 603 depending on the particular implementation.

Figure 7:
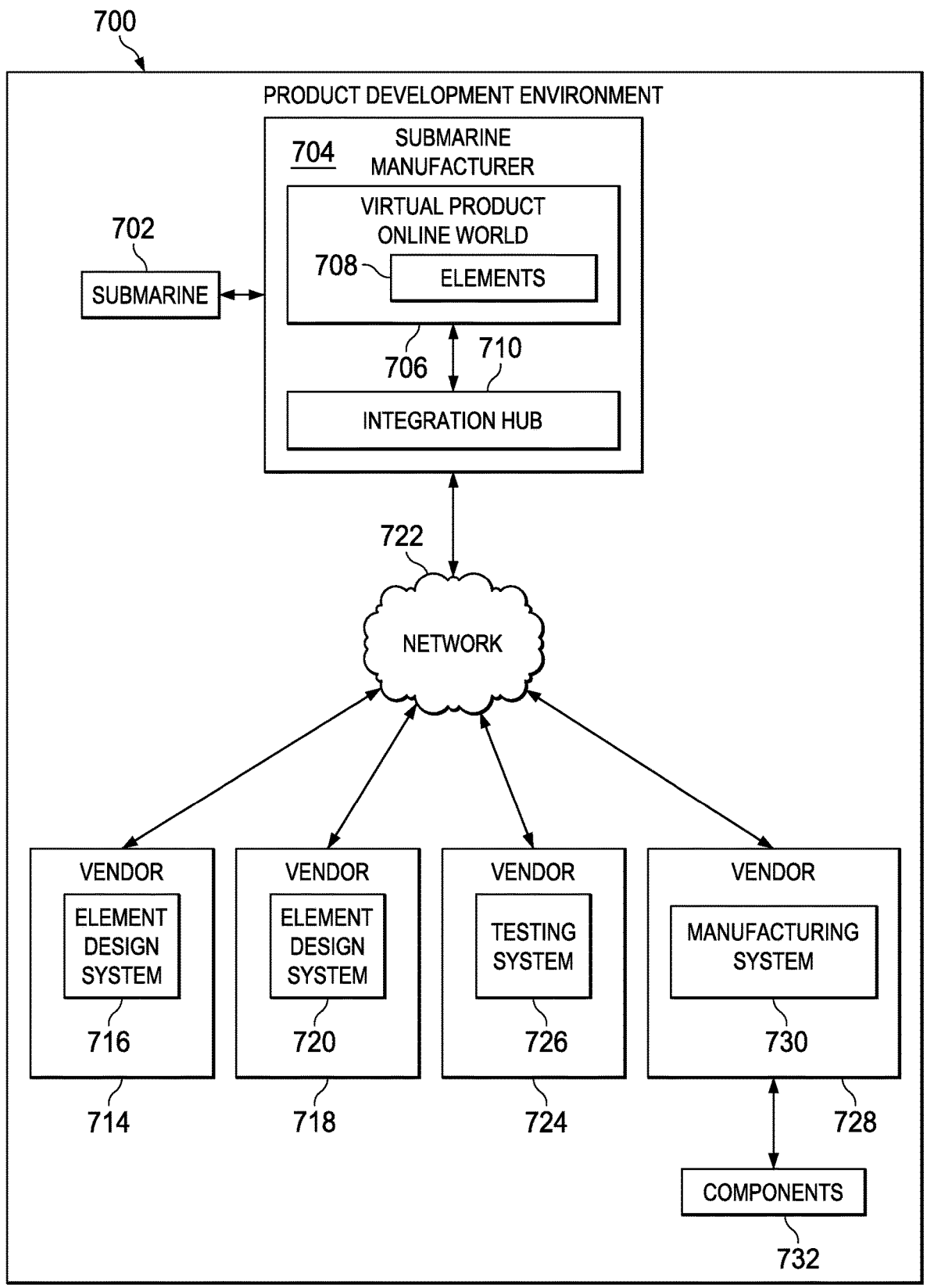
FIG. 7 is an illustration of a block diagram of a product development environment in accordance with an illustrative embodiment.

Turning now to FIG. 7, an illustration of a block diagram of a product development environment is depicted in accordance with an illustrative embodiment. In this depicted example, product development environment 700 is an example of an implementation for product development environment 100 shown in FIG. 1.

In this depicted example, product development environment 700 is used to develop a product in the form of submarine 702. As depicted, submarine manufacturer 704 has virtual product online world 706. Elements 708 in virtual product online world 706 are elements for submarine 702. Integration hub 710 is used to provide access to virtual product online world 706. In particular, integration hub 710 may provide access to elements 708 in virtual product online world 706.

As illustrated, vendor 714 has element design system 716 and vendor 718 has element design system 720. In this example, vendor 714 and vendor 718 may design elements 708. Elements 708 are sent to integration hub 710 for virtual product online world 706 using network 722.

In addition, the development of submarine 702 also may include testing of elements 708. For example, vendor 724 has testing system 726. Testing system 726 is an example of a product development system. Testing system 726 may be used to test elements 708 through simulations of elements 708 under different conditions.

In yet another example, vendor 728 may have manufacturing system 730. Vendor 728 may manufacture components 732 using elements 708 for submarine 702. Additionally, testing system 726 for vendor 724 also may test components 732 in these illustrative examples.

Manufacturing system 730 manufactures components 732 using elements 708. Elements 708 received from virtual product online world 706 by manufacturing system 730 are used to provide information to manufacture components 732.

The illustration of the product development environments and components within the environments in FIGS. 1-7 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although the illustrative examples have been directed toward a product in the form of an airplane or a submarine, it may also be applied to other products. For example, the product may be a mobile platform, a stationary platform, a land-based structure, an aquatic-based structure, a space-based structure, a surface ship, a tank, a personnel carrier, a train, a spacecraft, a space station, a vehicle, an automobile, a satellite, a submarine, a motorcycle, an appliance, a power plant, a bridge, a dam, a manufacturing facility, a building, an engine, an auxiliary power unit, a fuel tank, a mobile phone, a computer, a printed circuit board, a spreadsheet program, a word processing program, a fuselage, a wing, and a network.

Also, the illustration of particular numbers of vendors, development systems, and other components are not meant to imply limitations. The illustration of particular numbers of components in the different examples is only meant to provide illustrations of some implementations of an illustrative embodiment.

In still other illustrative examples, the different components in components 200 for integration hub 118 in FIG. 2 may be combined or further subdivided. For example, security manager 206 may include a security manager that identifies information that can be distributed to different organizations. Another security manager may be implemented to provide desired encryption for elements.

As another example, element 300 in FIG. 3 may include some or all of the elements illustrated. In some illustrative examples, work structure component 304 and requirements structure component 306 may be omitted. In still other illustrative examples, other types of information also may be included in element 300. For example, element 300 also may include timestamps identifying when different components were modified or changed. In still other illustrative examples, a process component may be present identifying steps or operations performed to manufacture element 300.

Thus, the illustrations of product development environments and the different components in those environments in FIGS. 1-7 provide a structure, process or both for integrating design systems and other development systems used by multiple vendors in manufacturing a product such as an aircraft. In this manner, the flow of information between vendors may be integrated and provide a more efficient product development environment.

Figure 8:
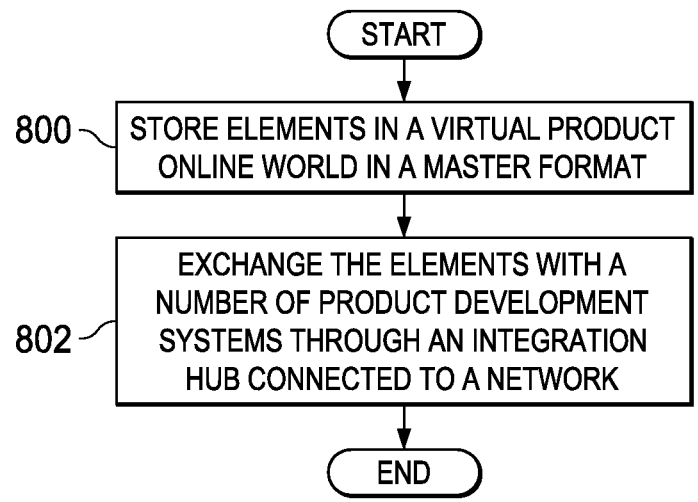
FIG. 8 is an illustration of a flowchart of a process for developing a product in accordance with an illustrative embodiment.

Turning now to FIG. 8, a flowchart of a process for developing a product is depicted in accordance with an illustrative embodiment. The process illustrated in FIG. 8 may be implemented in product development environment 100 in FIG. 1. In this illustrative example, the different operations may be implemented using integration hub 118 in FIG. 1.

The process begins by storing elements in a virtual product online world in a master format (operation 800). The elements are exchanged with a number of product development systems through an integration hub connected to a network (operation 802), with the process terminating thereafter. In these illustrative examples, the number of product development systems is configured to develop the elements for the product. As discussed above, this development may take various forms including design, testing, evaluation, and other types of development activities.

In operation 802, these product development systems may design elements and send those elements to the integration hub for inclusion within the virtual product online world. Further, some product development systems may obtain elements from the virtual product online world for testing. Elements also may be obtained for use in designing additional elements that may be somehow related to or associated with the elements obtained from the virtual product online world.

Figure 9:
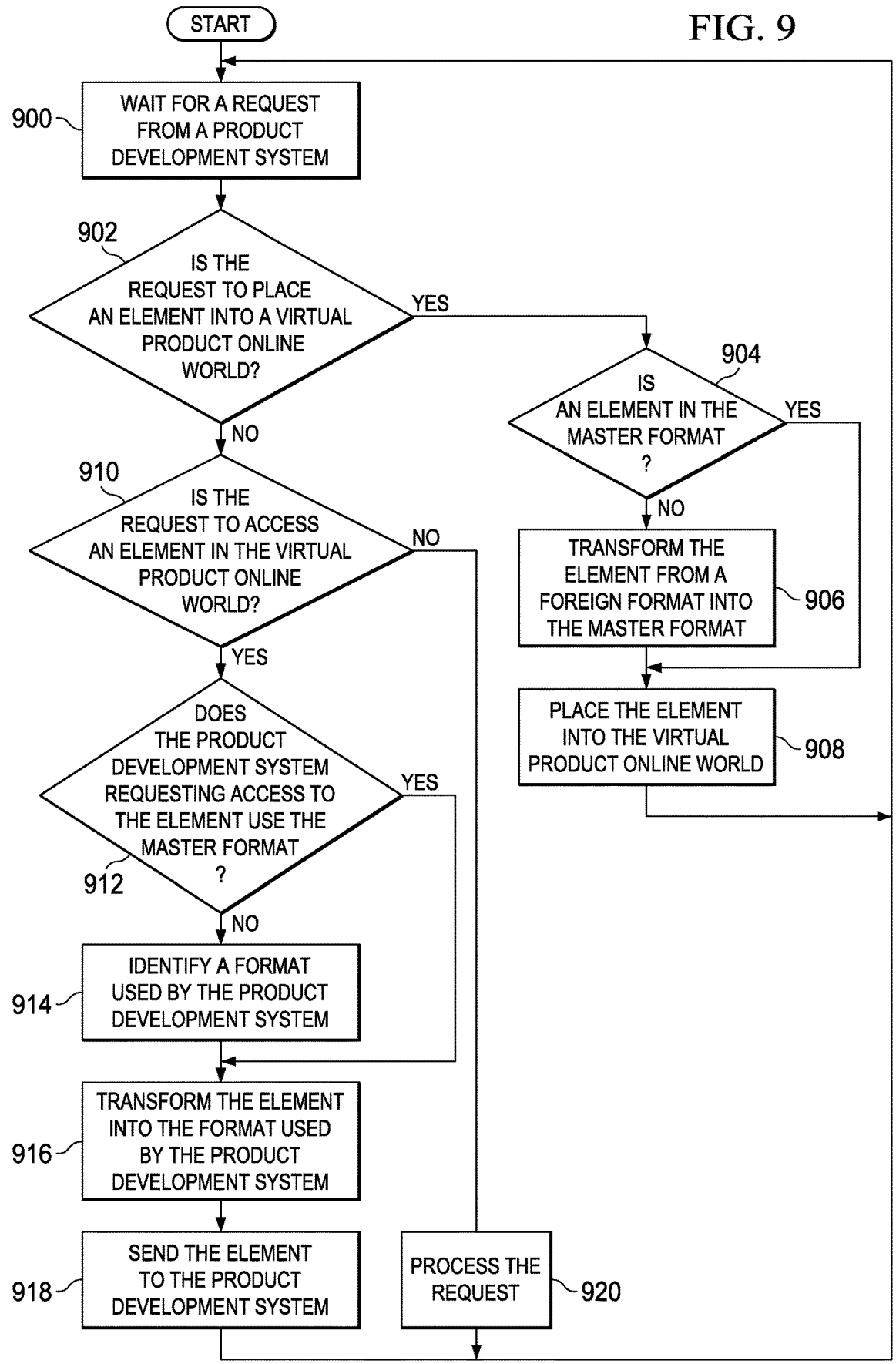
FIG. 9 is an illustration of a flowchart of a process for managing the exchange of elements in accordance with an illustrative embodiment.

Turning now to FIG. 9, a flowchart of a process for managing the exchange of elements is depicted in accordance with an illustrative embodiment. The process in this illustrative example may be implemented as part of exchanging elements with the number of development systems in operation 802 as described in FIG. 8.

The process begins by waiting for a request from a product development system (operation 900). When a request is received, a determination is made as to whether the request is to place an element into a virtual product online world (operation 902). If the request is to place an element into the virtual product online world, a determination is made as to whether the element is in a master format (operation 904).

If the element is not in the master format, the process transforms the element from a foreign format into the master format (operation 906). The process then places the element into the virtual product online world (operation 908), with the process then returning to operation 900 as described above.

With reference again to operation 904, if the element is in the master format, the process proceeds directly to operation 908. With reference again to operation 902, if the request is not to place an element into the virtual product online world, the process determines whether the request is to access an element in the virtual product online world (operation 910).

If the request is to access the element in the virtual product online world, the process determines whether the product development system requesting access to the element uses the master format (operation 912). If the product development system does not use the master format, the process identifies a format used by the product development system (operation 914). The process then transforms the element into the format used by the product development system (operation 916). Next, the process sends the element to the product development system (operation 918), with the process then returning to operation 900.

With reference again to operation 912, if the product development system requesting access to the element uses the master format, the process proceeds to operation 916 as described above. With reference again to operation 910, if the request is not to access an element in the virtual product online world, the request is processed (operation 920), with the process then returning to operation 900. This processing may take various forms. For example, the request may be a registration request to register a product development system, obtain statistical information about elements worked on by an organization, and other suitable types of requests.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 10:
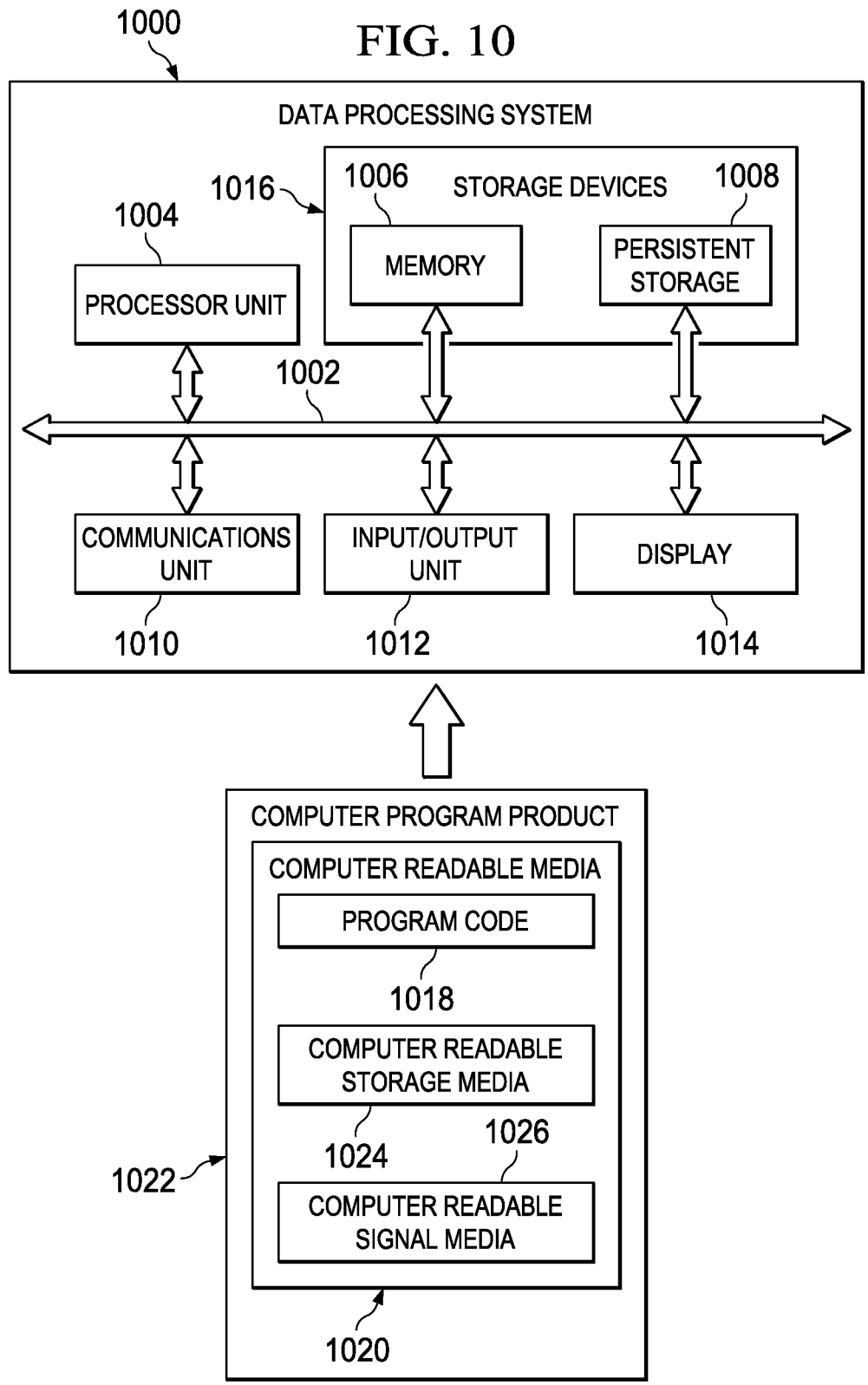
FIG. 10 is an illustration of a block diagram of a data processing system in accordance with an illustrative embodiment.

Turning now to FIG. 10, an illustration of a block diagram of a data processing system is depicted in accordance with an illustrative embodiment. Data processing system 1000 may be used to implement one or more computers in computer system 115 in product development environment 100 as well as computers or other computing devices that may be used to implement other components such as, for example, product development systems 116 and other suitable components that may require processing of information. In this illustrative example, data processing system 1000 includes communications framework 1002, which provides communications between processor unit 1004, memory 1006, persistent storage 1008, communications unit 1010, input/output (I/O) unit 1012, and display 1014. In this example, communication framework may take the form of a bus system.

Processor unit 1004 serves to execute instructions for software that may be loaded into memory 1006. Processor unit 1004 may be a number of processors, a multi-processor core, or some other type of processor, depending on the particular implementation.

Memory 1006 and persistent storage 1008 are examples of storage devices 1016. A storage device is any piece of hardware that is capable of storing information, such as, for example, without limitation, data, program code in functional form, and/or other suitable information either on a temporary basis and/or a permanent basis. Storage devices 1016 may also be referred to as computer readable storage devices in these illustrative examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that may be connected to data processing system 1000. For example, input/output unit 1012 may provide a connection for user input through a keyboard, a mouse, and/or some other suitable input device. Further, input/output unit 1012 may send output to a printer. Display 1014 provides a mechanism to display information to a user.

Instructions for the operating system, applications, and/or programs may be located in storage devices 1016, which are in communication with processor unit 1004 through communications framework 1002. The processes of the different embodiments may be performed by processor unit 1004 using computer-implemented instructions, which may be located in a memory, such as memory 1006.

These instructions are referred to as program code, computer usable program code, or computer readable program code that may be read and executed by a processor in processor unit 1004. The program code in the different embodiments may be embodied on different physical or computer readable storage media, such as memory 1006 or persistent storage 1008.

Program code 1018 is located in a functional form on computer readable media 1020 that is selectively removable and may be loaded onto or transferred to data processing system 1000 for execution by processor unit 1004. Program code 1018 and computer readable media 1020 form computer program product 1022 in these illustrative examples. In one example, computer readable media 1020 may be computer readable storage media 1024 or computer readable signal media 1026.

In these illustrative examples, computer readable storage media 1024 is a physical or tangible storage device used to store program code 1018 rather than a medium that propagates or transmits program code 1018.

Alternatively, program code 1018 may be transferred to data processing system 1000 using computer readable signal media 1026. Computer readable signal media 1026 may be, for example, a propagated data signal containing program code 1018. For example, computer readable signal media 1026 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 1000 are not meant to provide architectural limitations to the manner in which different embodiments may be implemented. The different illustrative embodiments may be implemented in a data processing system including components in addition to and/or in place of those illustrated for data processing system 1000. Other components shown in FIG. 10 can be varied from the illustrative examples shown. The different embodiments may be implemented using any hardware device or system capable of running program code 1018.

Illustrative embodiments of the disclosure may be described in the context of aircraft manufacturing and service method 1100 as shown in FIG. 11 and aircraft 1200 as shown in FIG. 12. Specifically, components manufactured using elements in a virtual product online world may be described in the context of aircraft manufacturing and service method 1100 as shown in FIG. 11 and aircraft 1200 as shown in FIG. 12.

Turning first to FIG. 11, an illustration of an aircraft manufacturing and service method is depicted in accordance with an illustrative embodiment. During pre-production, aircraft manufacturing and service method 1100 may include specification and design 1102 of aircraft 1200 in FIG. 12 and material procurement 1104.

During production, component and subassembly manufacturing 1106 and system integration 1108 of aircraft 1200 in FIG. 12 takes place. Thereafter, aircraft 1200 in FIG. 12 may go through certification and delivery 1110 in order to be placed in service 1112. While in service 1112 by a customer, aircraft 1200 in FIG. 12 is scheduled for routine maintenance and service 1114, which may include modification, reconfiguration, refurbishment, and other maintenance or service.

Each of the processes of aircraft manufacturing and service method 1100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of an aircraft is depicted in which an illustrative embodiment may be implemented. In this example, aircraft 1200 is produced by aircraft manufacturing and service method 1100 in FIG. 11 and may include airframe 1202 with plurality of systems 1204 and interior 1206. Examples of systems 1204 include one or more of propulsion system 1208, electrical system 1210, hydraulic system 1212, and environmental system 1214. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1100 in FIG. 11. For example, one or more illustrative embodiments may be implemented to develop aircraft 1200 during specification and design 1102. Further, an illustrative embodiment also may be implemented to develop components for aircraft 1200 during maintenance and service 1114. For example, products in the form of components for aircraft 1200 may be developed for use in performing refurbishment, maintenance, upgrades, and other operations during maintenance and service 1114. As yet another example, development of products in the form of components for aircraft 1200 may occur during system integration 1108. The activities during this stage may include redesigning components or designing new components depending on progress or issues identified during system integration 1108.

Thus, one or more of the illustrative embodiments provide a product development environment for developing products. A virtual product online world is provided for use by different organizations that may design components for the product. The virtual versions of these components designed by the organizations take the form of elements. These elements are managed by an integration hub that provides access to a virtual product online world. With the use of one or more virtual product online worlds, different organizations may collaborate in the development of a product. In particular, components may be designed, tested, evaluated, and otherwise manipulated or analyzed to develop a product.

With the use of one or more virtual product online worlds, different organizations may access the virtual product online worlds with less complexity in exchanging information between the different organizations as compared to currently available methods. With one or more illustrative embodiments, the virtual product online world and the integration hub reduce or eliminate a need for organizations to be able to change the formats of information received from other organizations to their format and vice versa. Further, with the use of the virtual product online world in the illustrative examples, different operations may be performed with less expense. The different organizations do not need to have software to perform the transformations of the information. Further, the different organizations also do not need to have different types of systems to accommodate different types of formats in performing development operations.

With a virtual product online world, a common product development space is provided for the different organizations that may be involved in developing the product. Further, a hierarchy of virtual product online worlds may be employed to further provide a distribution of information and access to users who may need different levels of granularity of information in developing products.

Thus, the illustrative embodiments, allow a manufacturers and vendors to exchange information in a seamless and as close to real time as possible. One or more of the illustrative embodiments provide a system that is capable of providing the exchange of information with a desired accuracy during the development of the product. The exchange of information is provided in one or more illustrative embodiments through a product development environment that is accessed by multiple users. The product development environment may have one or more virtual product words that allow for activities, such as collecting, retrieving, storing, managing, visualizing, and other activities by manufacturers, vendors, and other organizations.

The description of the different illustrative embodiments has been presented for purposes of illustration and description, and is not intended to be exhaustive or limited to the embodiments in the form disclosed. Many modifications and variations will be apparent to those of ordinary skill in the art.

Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A product development environment comprising:
  a computer system comprising an integration hub comprising:
    a virtual product online world manager configured to manage elements for a product under development in a virtual product online world on the computer system, wherein a number of organizations develop the elements within the virtual product online world on the computer system by accessing the computer system via a network such that a number of product development systems develop the elements within the virtual product online world on the computer system, and wherein the elements are three-dimensional virtual representations of physical objects;
    a product structure manager configured to manage a hierarchy having a plurality of levels in which the elements for the product are distributed, wherein the hierarchy identifies where each element in the elements for the product is located in the product with respect to other elements in the elements for the product and elements on a lower level of the hierarchy that are combined to form an assembly element on a higher level of the hierarchy;

a transformer configured to exchange the elements with the number of product development systems developing the elements over the network and transform an element in the elements received in a foreign file format from a product development system in the number of product development systems into a master file format used in the virtual product online world on the computer system, wherein the transformer is configured to:
receive a request from a first product development system operated by a first organization to place the element into the virtual product online world on the computer system,
determine whether the element is in the master file format or in a first foreign file format,
transform the element from the first foreign file format into the master file format in response to a determination that the element is in the first foreign file format,
place the element in the master file format into the virtual product online world,
receive a request from a second product development system operated by a second organization to access the element in the virtual product online world,
determine whether a format used by the second product development system is the master file format or a second foreign file format,
transform the element from the master file format into the second foreign file format and send the element in the second foreign file format to the second product development system in response to a determination that the format used by the second product development system is the second foreign file format, and
send the element in the master file format to the second product development system in response to a determination that the format used by the second product development system is the master file format; and
a security manager configured to operate within the virtual product online world to manage information in the elements for the development of the elements within the virtual product online world based on a security policy, wherein the security manager implements rules to handle sharing of information associated with the elements such that clearance to access the assembly element on the higher level of the hierarchy is required to access the elements on the lower level of the hierarchy that are combined to form the assembly element, and wherein the elements include a security component that identifies security requirements for the elements; and
a manufacturing system communicably coupled to the computer system and configured to receive the elements in the master file format and to create physical forms of the elements.

2. The product development environment of claim 1 further comprising:
a work structure manager configured to manage assignment of work for developing the product.

3. The product development environment of claim 1, wherein the element is a virtual representation of a component for the product.

4. The product development environment of claim 1, wherein the element comprises a work structure component that identifies an organization that is developing the element and where the element fits in a plan for developing the product.

5. The product development environment of claim 1, wherein the element comprises a product structure component that identifies a location of the element with respect to other elements within the product.

6. The product development environment of claim 1, wherein the product development system in the number of product development systems is configured to perform at least one of designing the element in the elements, testing the element, performing simulations with the element, modifying the element, or evaluating the element.

7. The product development environment of claim 1, wherein the product development system in the number of product development systems is selected from at least one of one of a computer aided design system, a technology computer aided design system, a manufacturing system, or another virtual product online world.

8. The product development environment of claim 1, wherein the virtual product online world is a product development system.

9. The product development environment of claim 1, wherein developing the elements comprises at least one of designing the elements, testing the elements, performing simulations with the elements, modifying the elements, or evaluating the elements.

10. The product development environment of claim 1, wherein the security component identifies restrictions on the distribution or use of elements.

11. The product development environment of claim 1, wherein:
the security manager is configured to use the security policy to identify whether the element is to be encrypted, to identify the type of encryption to be used to encrypt the element, and to encrypt the element; and
the element includes a plurality of components comprising a plurality of different formats and the security component of the element comprises encryption of the plurality of components.

12. The product development environment of claim 11, wherein the plurality of components comprise a work structure component, a requirements structure component, a product structure component, and a visualization component.

13. The product development environment of claim 1, wherein the rules in the security policy are based on agreements between the organizations.

14. The product development environment of claim 1, wherein the product is an aircraft and organizations are vendors developing the elements for the aircraft.

15. A product development environment comprising:
a computer system comprising
an integration hub comprising:
a virtual product online world manager configured to manage elements for a vehicle under development in a virtual product online world on the computer system, wherein a number of organizations develop the elements within the virtual product online world by accessing the computer system via a network such that a number of product development systems develop the elements within the virtual product online world on the computer system, and wherein the elements are three-dimensional virtual representations of physical objects;
a product structure manager configured to manage a hierarchy having a plurality of levels in which the elements for the vehicle are distributed, wherein the hierarchy identifies where each element in the elements for the vehicle is located in the vehicle with respect to other elements in the elements for the vehicle and elements on a lower level of the hierarchy that are combined to form an assembly element on a higher level of the hierarchy;

a transformer configured to exchange the elements with the product development systems developing the elements over the network, receive a request from a first product development system operated by a first organization to place an element in the elements into the virtual product online world on the computer system, determine whether the element is in a master file format or in a first foreign file format, transform the element from the first foreign file format into the master file format in response to a determination that the element is in the first foreign file format, place the element in the master file format into the virtual product online world, receive a request from a second product development system operated by a second organization to access the element in the virtual product online world, determine whether a format used by the second product development system is the master file format or a second foreign file format, transform the element from the master file format into the second foreign file format and send the element in the second foreign file format to the second product development system in response to a determination that the format used by the second product development system is the second foreign file format, and send the element in the master file format to the second product development system in response to a determination that the file format used by the second product development system is the master file format;

a security manager configured to operate within the virtual product online world to manage information in the elements for development of the elements within the virtual product online world based on a security policy, wherein the security manager implements rules to handle sharing of information associated with the elements such that clearance to access the assembly element on the higher level of the hierarchy is required to access the elements on the lower level of the hierarchy that are combined to form the assembly element, wherein the elements include a security component that identifies security requirements for the elements such that the security component identifies restrictions on the distribution of the element;

a work structure manager configured to manage assignment of work for developing the vehicle; and a manufacturing system communicably coupled to the computer system and configured to receive the elements in the master file format and to create physical forms of the elements.

16. The product development environment of claim 15, wherein the element comprises:

a work structure component that identifies an organization that is developing the element and where the element fits in a plan for developing the vehicle; and a product structure component that identifies a location of the element with respect to other elements within the vehicle.

17. The product development environment of claim 15, wherein a product development system in the product development systems is selected from one of a computer aided design system, a technology computer aided design system, or another virtual product online world.

18. A product development environment comprising:

a computer system comprising:

virtual product online worlds, wherein each virtual product online world in the virtual product online worlds comprises an integration hub configured to store elements, wherein the integration hub comprises:

a virtual product online world manager configured to manage elements for a product under development in the product development environment, wherein a number of organizations develop the elements within the virtual product online world on the computer system by accessing the computer system via a network such that a number of product development systems develop the elements within the virtual product online world on the computer system, and wherein the elements are three-dimensional virtual representations of physical objects;

a product structure manager configured to manage a hierarchy having a plurality of levels in which the elements for the product are distributed, wherein the hierarchy identifies where each element in the elements for the product is located in the product with respect to other elements in the elements for the product and elements on a lower level of the hierarchy that are combined to form an assembly element on a higher level of the hierarchy;

a transformer configured to exchange the elements with a selected virtual product online world in a product development system in the number of product development systems in the virtual product online worlds developing the elements over the network, wherein the transformer is configured to:

receive a request from a first product development system operated by a first organization to place an element in the elements into the virtual product online world on the computer system, determine whether the element is in a master file format or in a first foreign file format, transform the element from the first foreign file format into the master file format in response to a determination that the element is in the first foreign file format, place the element in the master file format into the virtual product online world, receive a request from a second product development system operated by a second organization to access the element in the virtual product online world, determine whether a format used by the second product development system is the master file format or a second foreign file format, transform the element from the master file format into the second foreign file format and send the element in the second foreign file format to the second product development system in response to a determination that the format used by the second product development system is the second foreign file format, and send the element in the master file format to the second product development system in response to a determination that the format used by the second product development system is the master file format; and a security manager configured to operate within the virtual product online world to manage information in the elements for the development of the elements within the virtual product online world based on a security policy, wherein the security manager implements rules to handle sharing of information associated with the elements, such that clearance to access the assembly element on the higher level of the hierarchy is required to access the elements on the lower level of the hierarchy that are combined to form the assembly element, and wherein the elements include a security component that identifies security requirements for the elements; and a manufacturing system communicably coupled to the computer system and configured to receive the elements in a master three-dimensional file format and to create physical forms of the elements.

19. The product development environment of claim 18, wherein the product development system in the selected virtual product online world is selected from at least one of a computer aided design system, a technology computer aided design system, or another virtual product online world.

20. A method for developing a product, the method comprising:

storing elements in a virtual product online world in a master three-dimensional file format in a computer system;

exchanging the elements with a number of product development systems through an integration hub connected to a network, wherein the integration hub is configured to store elements, wherein the number of product development systems is configured to develop the elements for the product by accessing the computer system via a network such that the number of product development systems develop the elements within the virtual product online world on the computer system, and wherein the elements are three-dimensional virtual representations of physical objects;

managing, by a product structure manager, a hierarchy having a plurality of levels in which the elements for the product are distributed, wherein the hierarchy identifies where each element in the elements for the product is located in the product with respect to other elements in the elements for the product and elements on a lower level of the hierarchy that are combined to form an assembly element on a higher level of the hierarchy;

receiving, by the integration hub, a request from a first product development system operated by a first organization to place an element in the elements into the virtual product online world on the computer;

determining whether the element is in the master file format or in a first foreign file format;

transforming, by the integration hub, the element from the first foreign file format into the master file format in response to a determination that the element is in the first foreign file format;

placing the element in the master file format into the virtual product online world;

receiving a request from a second product development system operated by a second organization to access the element in the virtual product online world;

determining whether a format used by the second product development system is the master file format or a second foreign file format;

transforming the element from the master file format into the second foreign file format and sending the element in the second foreign file format to the second product development system in response to a determination that the format used by the second product development system is the second foreign file format;

sending the element in the master file format to the second product development system in response to a determination that the format used by the second product development system is the master file format;

developing the elements within the virtual product online world by a number of organizations;

managing, by the integration hub, information in the elements to operate within the virtual product online world for the development of the elements within the virtual product online world based on a security policy, wherein a security manager implements rules to handle sharing of information associated with the elements, such that clearance to access the assembly element on the higher level of the hierarchy is required to access the elements on the lower level of the hierarchy that are combined to form the assembly element and wherein the elements include a security component that identifies security requirements for the elements; and creating physical forms of the elements received in the master three-dimensional file format in a manufacturing system.

21. The method of claim 20, wherein the integration hub provides access to the virtual product online world to perform at least one of a design, test, evaluation, visualization, navigation, access, verification, conversion, validation, manipulation, management, control, integration, or analyzing function.

* * * * *